(No Model.)
P. SMALL.
RESERVOIR ATTACHMENT FOR AMMONIA ICE MACHINES.
No. 290,490. Patented Dec. 18, 1883.
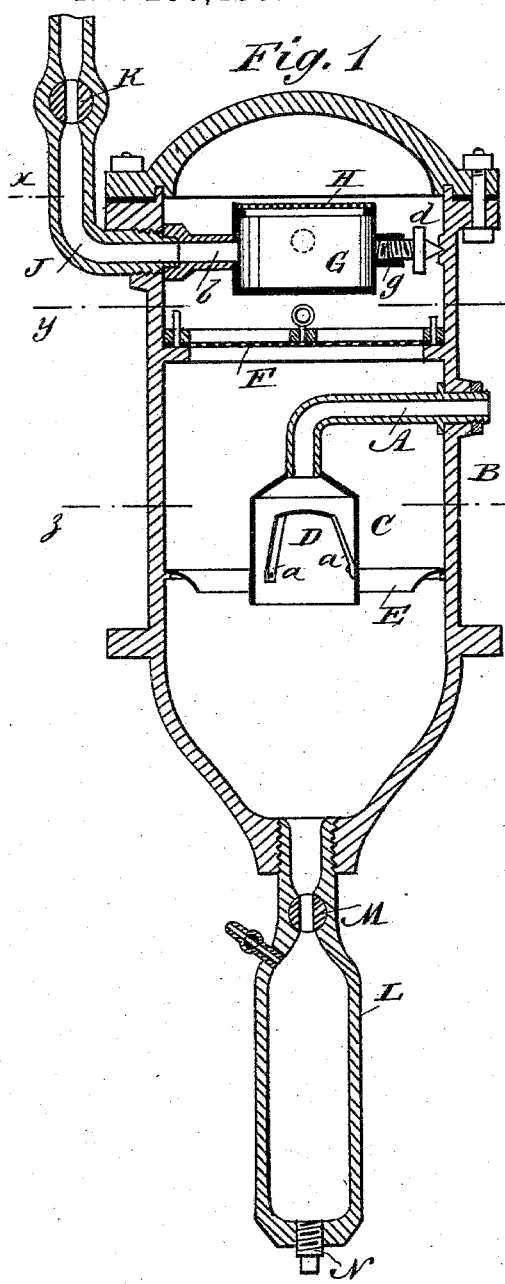
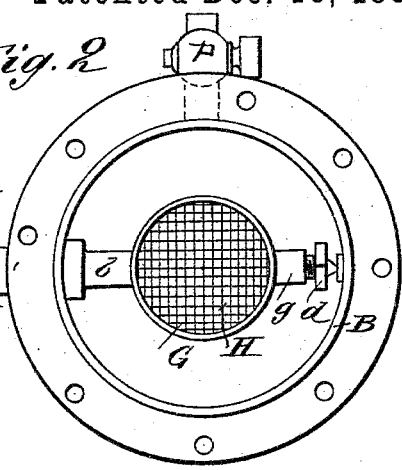
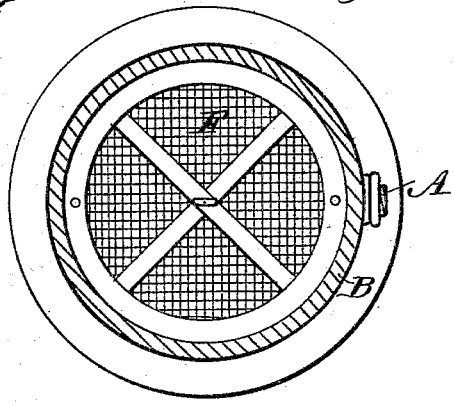
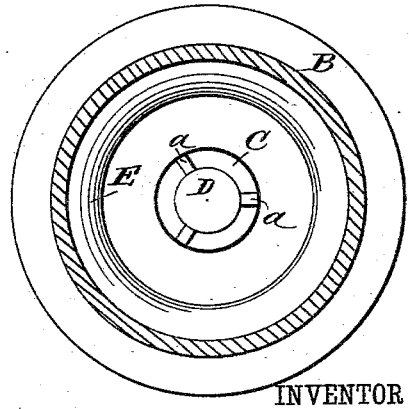
WITNESSES:
C. Neveux
C. Sedgwick
INVENTOR:
P. Small
BY Munn & Co.
ATTORNEYS.

UNITED STATES PATENT OFFICE.

PERRY SMALL, OF GUAYMAS, MEXICO.

RESERVOIR ATTACHMENT FOR AMMONIA ICE-MACHINES.

SPECIFICATION forming part of Letters Patent No. 290,490, dated December 18, 1883.

Application filed July 24, 1883. (No model.)

*To all whom it may concern:*

Be it known that I, PERRY SMALL, of Guaymas, Mexico, have invented a new and Improved Reservoir Attachment for Ammonia Ice-Machines, of which the following is a full, clear, and exact description.

The object of my invention is to provide a new and improved attachment for the ammonia-reservoirs of ice-machines for the purpose of separating the oil and black-lead taken up by the gas in the pump from the gas, so that the same will leave the reservoir perfectly pure, whereby clogging of the pipes of the gas-machines by the oil and plumbago is avoided.

The invention consists in a gas-reservoir into which the ammonia-gas is conducted, provided with strainers and cups and flanges for keeping the gas at the bottom of the reservoir and permitting it to rise slowly, so that the oil and plumbago will be held back by the strainers, and will collect on the bottom of the reservoir, and can finally be admitted into a collecting-receptacle on the bottom of the reservoir.

Reference is to be had to the accompanying drawings, forming part of this specification, in which similar letters of reference indicate corresponding parts in all the figures.

Figure 1 is a longitudinal sectional elevation of an ammonia-gas reservoir provided with my improvement. Fig. 2 is a sectional plan view of the same on the line $x\,x$, Fig. 1. Fig. 3 is a sectional plan view of the same on the line $y\,y$, Fig. 1. Fig. 4 is a sectional plan view of the same on the line $z\,z$, Fig. 1.

The inlet-pipe A, which conducts the ammonia-gas into the reservoir B, has its end bent downward within the reservoir, and has an enlargement or inverted cup, C, formed on its end, which is located in the lower third of the reservoir. In the cup C a plate, D, is held a short distance below the end of the pipe A by arms $a$. A downwardly-inclined ring, E, secured to the inner surface of the reservoir, surrounds the cup. Above the pipe A a circular sieve or strainer, F, is held transversely in the reservoir, and above the same a vessel, G, is held in the reservoir, the top of which vessel consists of a strainer, H. The outlet-pipe J is in communication with the vessel G, which outlet-pipe is provided with a cock, K, outside of the reservoir. A receptacle, L, is screwed in the bottom of the reservoir, and is provided at its upper end with a cock, M, and in its bottom with a screw-plug, N. The vessel G is held removable by a connecting-pipe, $b$, fitting over the end of the pipe J, and by a screw, $d$, screwed into a threaded collar, $g$, on the vessel. The ammonia-gas, which enters through the pipe A, expands in the cup C, and is directed downward, and is prevented from rising rapidly by the cup and by the downwardly-inclined ring E. The oil and plumbago used to lubricate the pump, and which have been absorbed by the gas in the pump, do not rise with the gas, but collect in the bottom of the reservoir. The remaining oil and plumbago held in suspense by the gas are held back by the strainers F H, through which the gas must pass, and drop to the bottom of the reservoir or collect on the vessel G. The quantity of gas passing through the reservoir and the rapidity with which the gas passes through the reservoir can be regulated by means of the cock K. The vessel G can be removed and emptied at suitable intervals. During this operation the cock M is closed. I also provide pipe P with a cock at the upper end of the reservoir. In case the pumps are to be opened for repacking them, &c., a vacuum is pumped in the pipes in the ice-house. Then the inlet-pipe to the pump is closed, the cock from the receiver to the condenser is closed, and then the small cock in the side of receiver which leads to the inlet-pipe to the pump, is opened. All the gas will then escape to the pipes in the ice-house, and the pumps or receiver can be opened without causing any loss of gas.

I do not abandon or dedicate to the public any patentable feature set forth herein and not hereinafter claimed, but reserve the right to claim the same either in a reissue of any patent that may be granted upon this application or in other applications for Letters Patent that I may make.

Having thus described my invention, what I claim as new, and desire to secure by Letters Patent, is—

1. An ammonia-gas reservoir for an ice-machine, provided with strainers, substantially as herein shown and described.

2. The combination, with a gas-reservoir of an ice-machine, of a downwardly-bent gas-inlet pipe and a series of strainers above the pipe, substantially as herein shown and described.

3. The combination, with the gas-reservoir of an ammonia ice-machine, of a receptacle for oil, black-lead, &c, held to the bottom of the reservoir, substantially as herein shown and described.

4. The combination, with a gas-reservoir, of the downwardly-bent inlet-pipe A, the cup C at the end of the same, and of strainers above the inlet-pipe, substantially as herein shown and described.

5. The combination, with a gas-reservoir, of the downwardly-bent inlet-pipe A, the cup C on the end of the same, the plate D, held in the cup, and of strainers above the inlet-pipe, substantially as herein shown and described.

6. The combination, with a gas-reservoir, of the inlet-pipe A, the cup C, the downwardly-inclined ring E, and of strainers above the inlet-pipe, substantially as herein shown and described.

7. The combination, with a gas-reservoir, of an inlet-pipe, A, the strainer F, and the vessel G, provided with a strainer-top, H, and connected with the outlet-pipe, substantially as herein shown and described.

8. The combination, with a gas-reservoir, of an inlet-pipe, A, the strainer F, the vessel G, having a strainer-top, H, the tube b, the collar g, the screw d, and the inlet-pipe J, substantially as herein shown and described.

9. The combination, with a gas-reservoir, of an inlet-pipe, A, strainers held in the upper part of the reservoir, the receptacle L, held on the lower part of the reservoir, the cock M, and the screw-plug N, substantially as herein shown and described.

PERRY SMALL.

Witnesses:
JOSEPH BLACK,
C. CLAUSEN.